United States Patent
Nguyen et al.

(10) Patent No.: US 9,019,657 B1
(45) Date of Patent: Apr. 28, 2015

(54) COINED VCM TAB TO LIMIT COVER DEFLECTION UNDER PINCH LOAD

(71) Applicant: Western Digital Technologies, Inc., Irvine, CA (US)

(72) Inventors: Daniel T. Nguyen, Milpitas, CA (US); Scott E. Watson, San Jose, CA (US); Andre Y. Liem, San Jose, CA (US); Jonathan M. Garbarino, San Jose, CA (US); Joshua P. Weiher, Bellevue, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/802,486

(22) Filed: Mar. 13, 2013

(51) Int. Cl.
*G11B 33/02* (2006.01)

(52) U.S. Cl.
CPC ....................... *G11B 33/02* (2013.01)

(58) Field of Classification Search
CPC ... G11B 5/5521; G11B 5/5569; G11B 5/5573
USPC ................. 360/264.8, 266.7, 99.18
See application file for complete search history.

(56) References Cited

U.S. PATENT DOCUMENTS

| | | | |
|---|---|---|---|
| 5,235,482 A | 8/1993 | Schmitz | |
| 5,315,464 A * | 5/1994 | Tsujino | 360/99.08 |
| 5,315,466 A * | 5/1994 | Nishimoto et al. | 360/264.8 |
| 5,636,091 A * | 6/1997 | Asano | 360/264.3 |
| 5,650,895 A * | 7/1997 | Koizumi et al. | 360/99.18 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,125,016 A * | 9/2000 | Lin | 360/264.8 |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,288,866 B1 | 9/2001 | Butler et al. | |
| 6,292,333 B1 | 9/2001 | Blumentritt et al. | |
| 6,304,421 B1 * | 10/2001 | Brown | 360/264.8 |
| 6,344,950 B1 | 2/2002 | Watson et al. | |
| 6,347,023 B1 * | 2/2002 | Suwa | 360/264.8 |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |

(Continued)

*Primary Examiner* — Craig A. Renner

(57) ABSTRACT

A disk drive assembly including a disk drive enclosure including an enclosure main body forming an interior region, the interior region having a Voice Coil Motor (VCM) assembly receiving portion configured to hold a VCM assembly; and a cover member configured to engage the enclosure main body and cover the interior region of the enclosure main body, and expose at least a portion of the VCM Assembly receiving portion; and a VCM assembly disposed within the VCM assembly receiving portion of the enclosure main body, the VCM assembly comprising a cover supporting member configured to engage and support the cover member.

16 Claims, 5 Drawing Sheets

(56) References Cited

U.S. PATENT DOCUMENTS

| | | |
|---|---|---|
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,379 B1 | 4/2003 | Kazmierczak et al. |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,577,474 B2 | 6/2003 | Kazmierczak et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,213 B2 | 2/2004 | Lofstrom et al. |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,721,128 B1 * | 4/2004 | Koizumi et al. ............ 360/99.21 |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,847,507 B2 | 1/2005 | Wang et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,912,105 B1 * | 6/2005 | Morita et al. ................ 360/99.2 |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |

(56) References Cited

U.S. PATENT DOCUMENTS

| | | |
|---|---|---|
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,549,210 B2 | 6/2009 | Teo et al. |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 2001/0038509 A1 | 11/2001 | Lofstrom et al. |
| 2003/0218827 A1* | 11/2003 | Teo et al. ............... 360/264.8 |
| 2006/0034010 A1* | 2/2006 | Abe et al. ............... 360/97.02 |
| 2007/0035872 A1* | 2/2007 | Hayakawa et al. ...... 360/97.02 |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner ns, the disk drive 100 may include more or fewer disks. For

COINED VCM TAB TO LIMIT COVER DEFLECTION UNDER PINCH LOAD

FIELD

The present disclosure relates generally to information storage devices, and in particular to a disk drive storage device having a VCM supporting a portion of the drive cover.

BACKGROUND

Disk drives typically include a drive cover that attaches to a drive enclosure to enclose the drive components. However, with increasingly thinner HDD design, the thickness of the drive cover can increase the HDD thickness, which is disfavored. Further, as the drive cover becomes thinner, its rigidity may decrease and its ability to resist deflection under external load may be reduced. In such situations, an external load may cause deflection of the drive cover and damage to interior components of the drive may occur.

There is therefore a need for a drive enclosure that can reduce HDD thickness without sacrificing resistance to external load.

BRIEF DESCRIPTION OF THE DRAWINGS

A general architecture that implements the various features of the disclosure will now be described with reference to the drawings. The drawings and the associated descriptions are provided to illustrate implementations of the disclosure and not to limit the scope of the disclosure. Throughout the drawings, reference numbers are reused to indicate correspondence between referenced elements.

DETAILED DESCRIPTION

Figure 1:
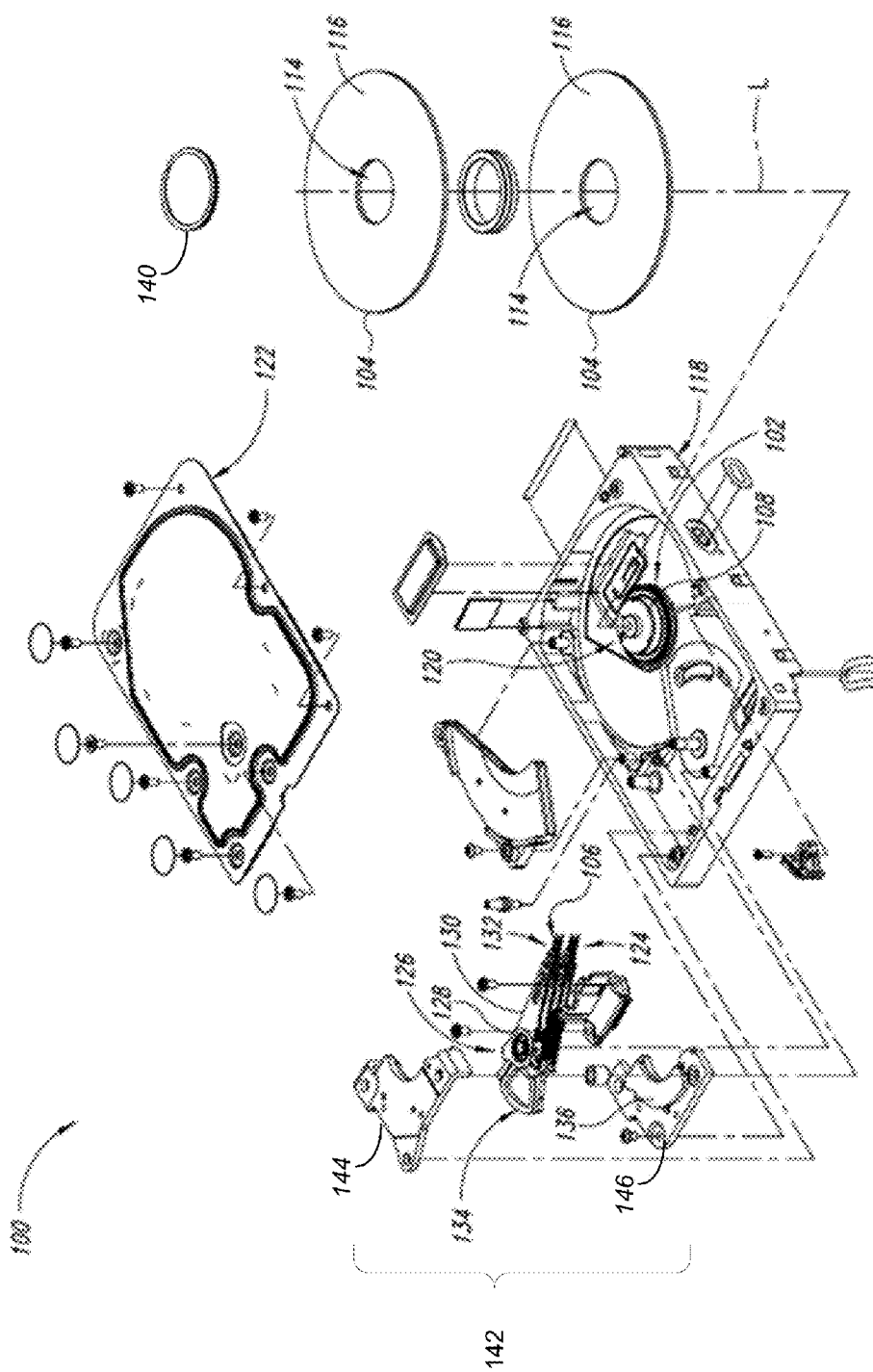
FIG. 1 is an exploded, perspective view generally illustrating a disk drive including a drive enclosure and cover according to related art.

Referring to FIG. 1, a disk drive 100 according to related art is illustrated for comparison purposes. The disk drive 100 comprises a hub 102, a disk 104 physically contacting and supported by at least one mounting surface (not labeled in FIG. 1) of the hub 102, and a head 106 operable to write to and read from the disk 104. In one implementation, the hub 102 comprises a substantially cylindrical portion 108 which define a longitudinal axis L and a mounting surface (not labeled in FIG. 1) substantially normal to the longitudinal axis L, the mounting surface (not labeled in FIG. 1) extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other implementations, the disk drive 100 may include more or fewer disks. For example, the disk drive 100 may include one disk or it may include two or more disks. The disks 104 each include a disk surface 116, as well as an opposing disk surface not visible in FIG. 1. In one implementation, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface of the hub 102. The interaction of the disk clamp 140 and the hub 102 to provide the downward clamping force is discussed in more detail below.

The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") 142 for controllably rotating the HSA 124. The VCM 142 also includes a top plate (yoke) 144 and a bottom plate (yoke) 146.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

The disk drive 100 may further include a cover 122, which, together with the motor base 118, may house all of the above discussed components of the disk drive. In the related art, the motor base 118 has a substantially rectangular shape. Further, the cover 122 also has a substantially rectangular shape, which covers all components of the hard disk drive 100.

Figure 2:
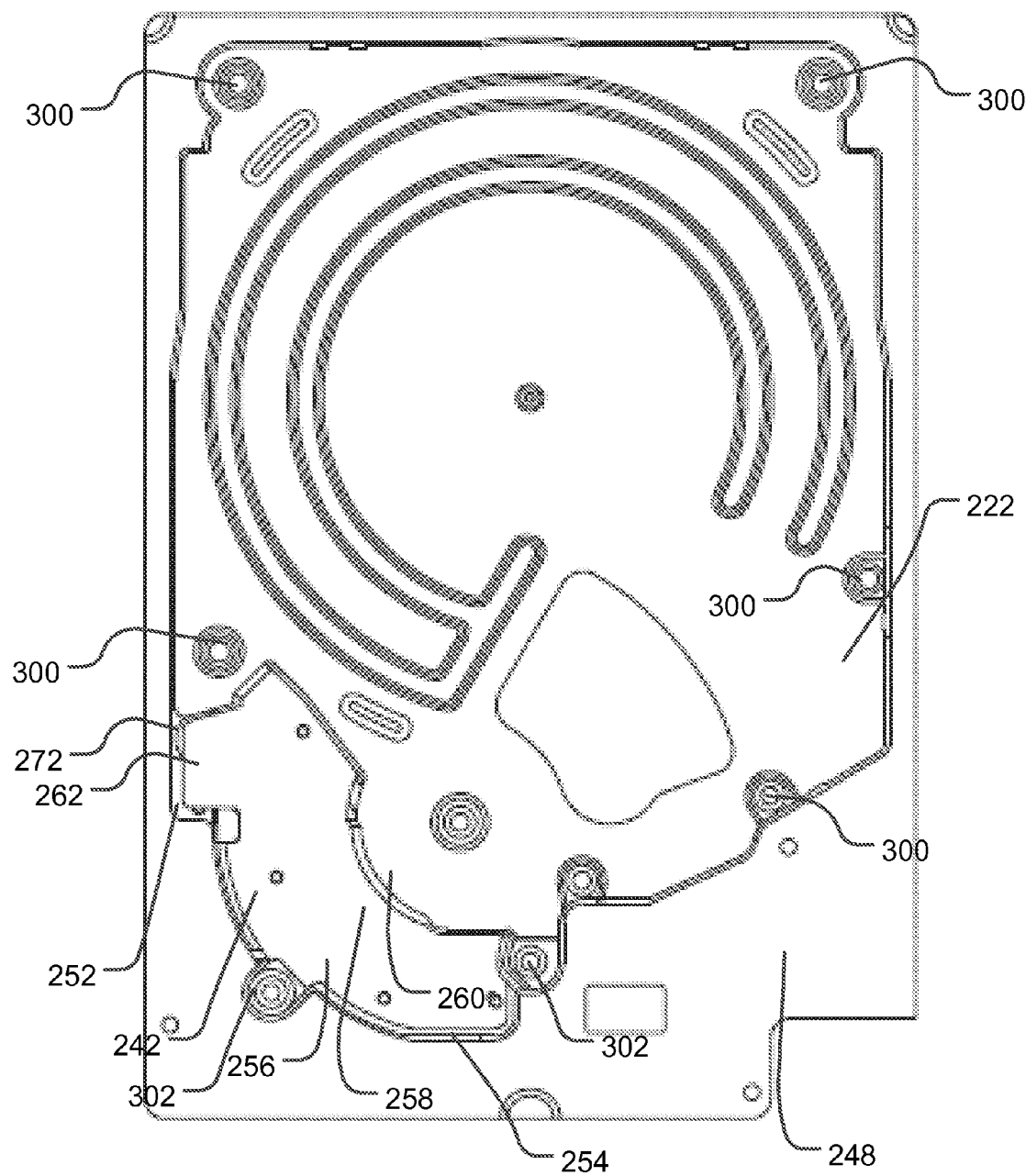
FIG. 2 is a top view illustrating a cover and enclosure according to an implementation of the present application.
Figure 3:
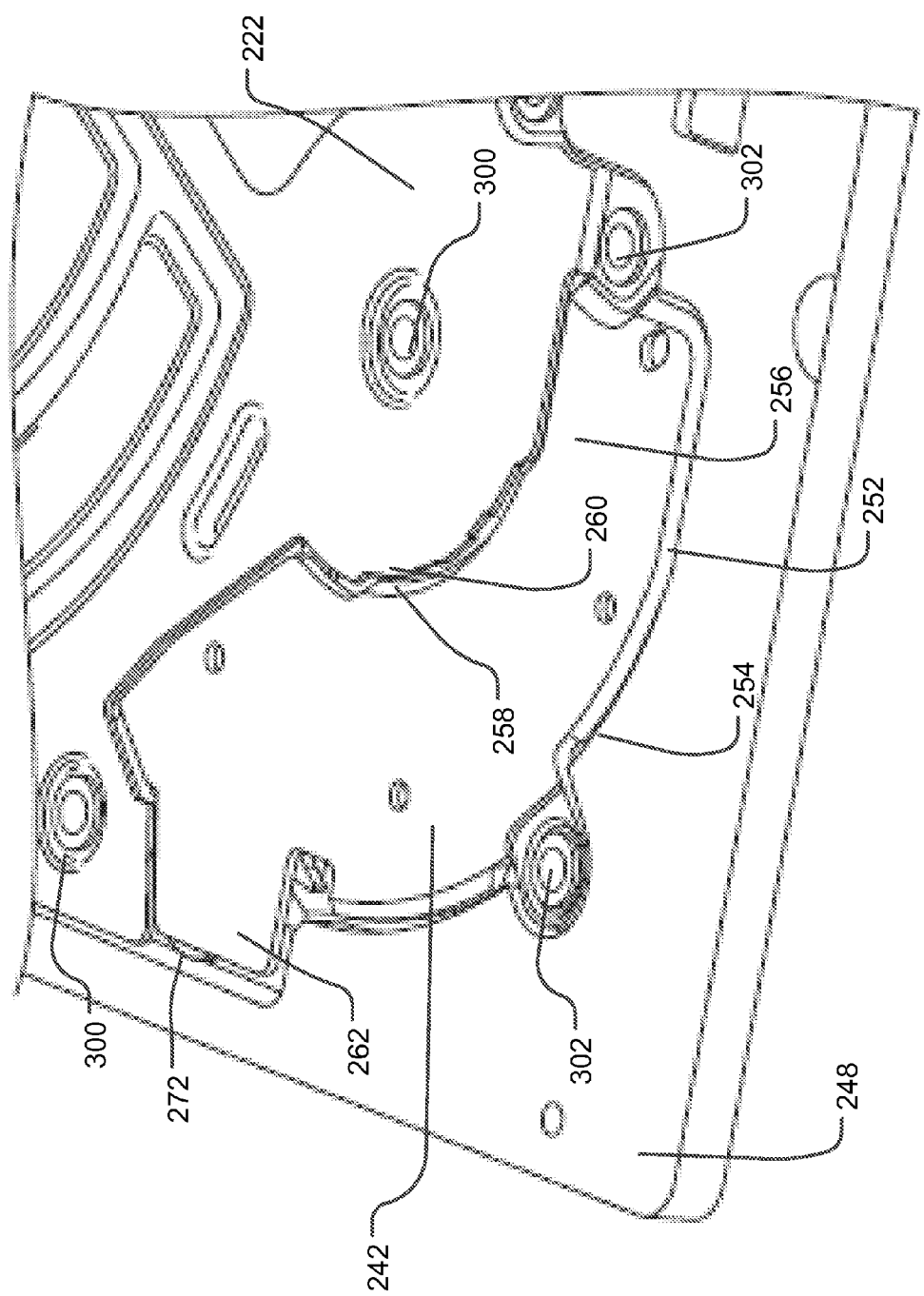
FIG. 3 is an enlarged perspective view illustrating the cover and enclosure according to the implementation of FIG. 2.

FIG. 2 is a top view illustrating a cover 222 and enclosure 248 according to an implementation of the present application. Further, FIG. 3 is an enlarged perspective view illustrating the cover 222 and enclosure 248 according to the implementation of FIG. 2. As illustrated in FIGS. 2 and 3, the drive enclosure is configured to have a recessed, interior area 252 in which the drive components are received. The attachment of the cover 222 to the enclosure 248 is not particularly limited, and may include attachment by screw members 300, bolts, rivets or any other attachment mechanisms as would be apparent to a person of ordinary skill in the art.

Unlike the cover of the disk drive according to related art, the cover 222 in this implementation covers many of the components housed in the recessed, interior area 252 of the enclosure 248, but does not cover the VCM assembly 242. Instead, the side walls 254 of the enclosure 248 extend upward to a height substantially equal to the VCM assembly 242 and wrap around the VCM assembly 242 on at least two sides to form a VCM receiving area. The attachment of the VCM assembly 242 to the enclosure 248 is not particularly limited, and may include attachment by screw members 302, bolts, rivets or any other attachment mechanisms as would be apparent to a person of ordinary skill in the art. Further, the VCM assembly 242 includes a top plate 256 that supports the cover 222 as best shown in FIG. 4.

More specifically, in one implementation, the top plate 256 includes a cover supporting tab 258 that extends outward from the VCM assembly 242 is formed to receive and support a supported portion 260 of the cover 222. The cover supporting tab 258 may be configured to extend from the VCM top plate 256 on a side of the VCM assembly 242 nearest the pivot point of an actuator arm (not shown in FIGS. 2 and 3) disposed in the recessed, interior area 252 of the enclosure 248. The structure of the cover supporting tab 258 is discussed in greater detail with respect to FIG. 4 below.

In addition to the features discussed above, in some implementations, the VCM top plate 256 may also include a tab 262 extending horizontally from VCM assembly 242 to cover or partially cover a latch mechanism 272 of an actuator arm disposed in the recessed, interior area 252 of the enclosure 248. In such implementations, the tab 262 may provide an upper limit on the vertical motion of the latch mechanism 272.

Figure 4:
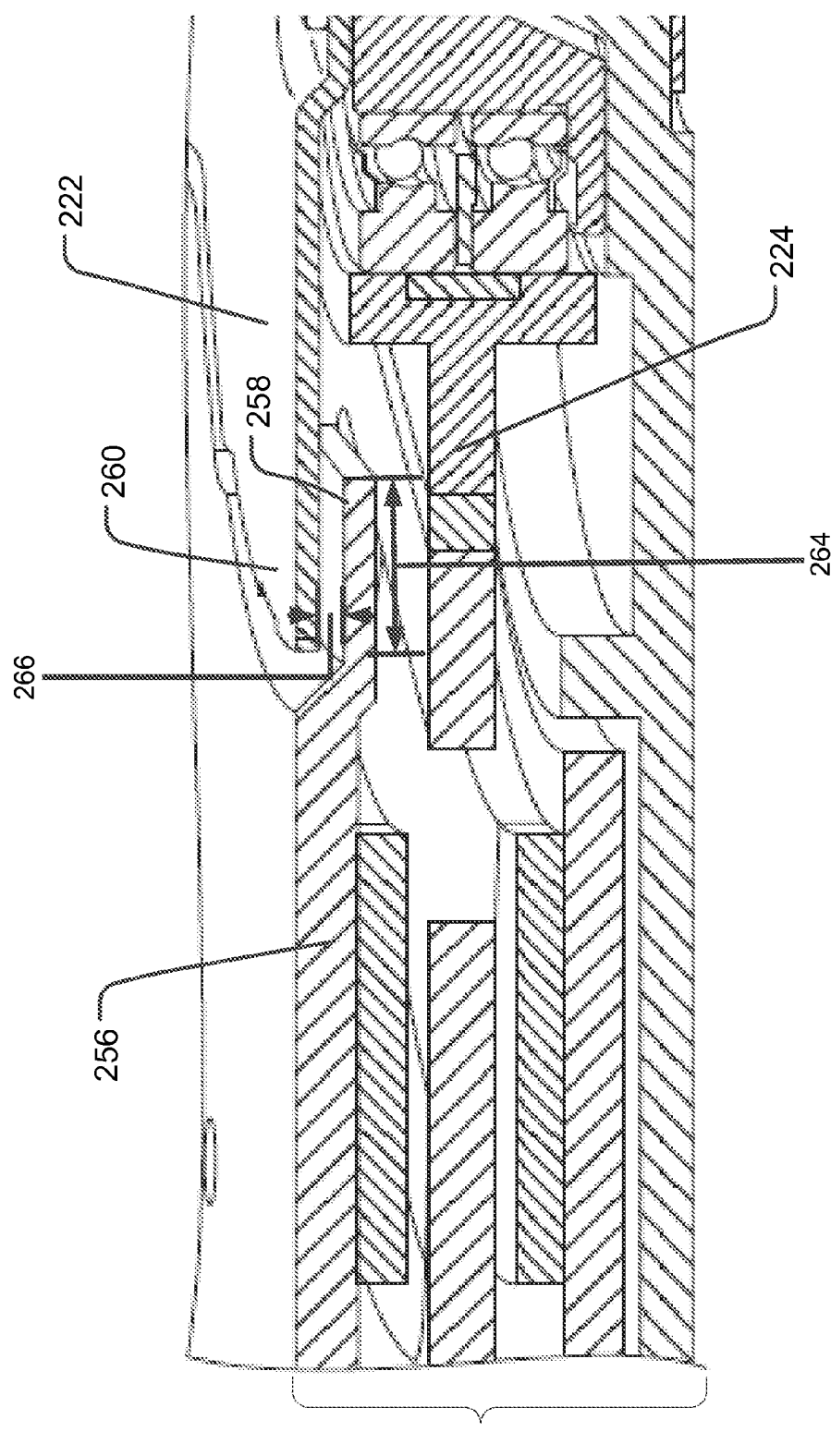
FIG. 4 is a sectional view of the cover and enclosure according to the implementation of FIG. 2.

FIG. 4 provides a sectional view of the cover 222 and enclosure 248 according to the implementation shown in FIGS. 2 and 3. As discussed above, the enclosure 248 has a recessed, interior area 252 (labeled in FIGS. 2 and 3) that houses the components of the drive. Further, the cover 222 covers many of the disposed within the recessed, interior area 252 (labeled in FIGS. 2 and 3), but the VCM assembly 242 is exposed and not covered by the cover 222. As shown, the VCM assembly 242 includes a top plate 256 that has a cover supporting tab 258 extending horizontally from the VCM assembly 242. The shape of this cover supporting tab 258 is not particularly limited and may be rectangular, curved, or any other shape as would be apparent to a person of ordinary skill in the art. Further, the cover supporting tab 258 is not particularly limited to a single tab, and may include two or more tabs configured to support a portion of the cover 222.

In the implementation shown in FIG. 4, the cover supporting tab 258 may be configured to extend underneath and support at least a portion of the cover 222 (the supported portion 260 of the cover) forming an overlapping region 264. In some implementations, the overlapping region may have a length of 200 or more microns in some implementations. In some implementations, the cover supporting tab 258 may have a recessed portion such that the supported portion 260 of the cover 222 has a height substantially equal to the height of the VCM top plate 256 of the VCM assembly 242. Additionally, the cover supporting tab 258 may be configured to extend over the head stack assembly (HSA) 224.

In some implementations, a gap 266 may be formed between the supported portion 260 of the cover 222 and the cover supporting portion 258 of the VCM top plate 256 such that the cover 222 and the VCM top plate 256 only contact when deflected under an exterior force applied by to the drive. Alternatively, in some implementations, the cover 222 and the cover supporting portion of the VCM top plate 256 may be contacting even when no exterior force is applied to the drive.

Figure 5:
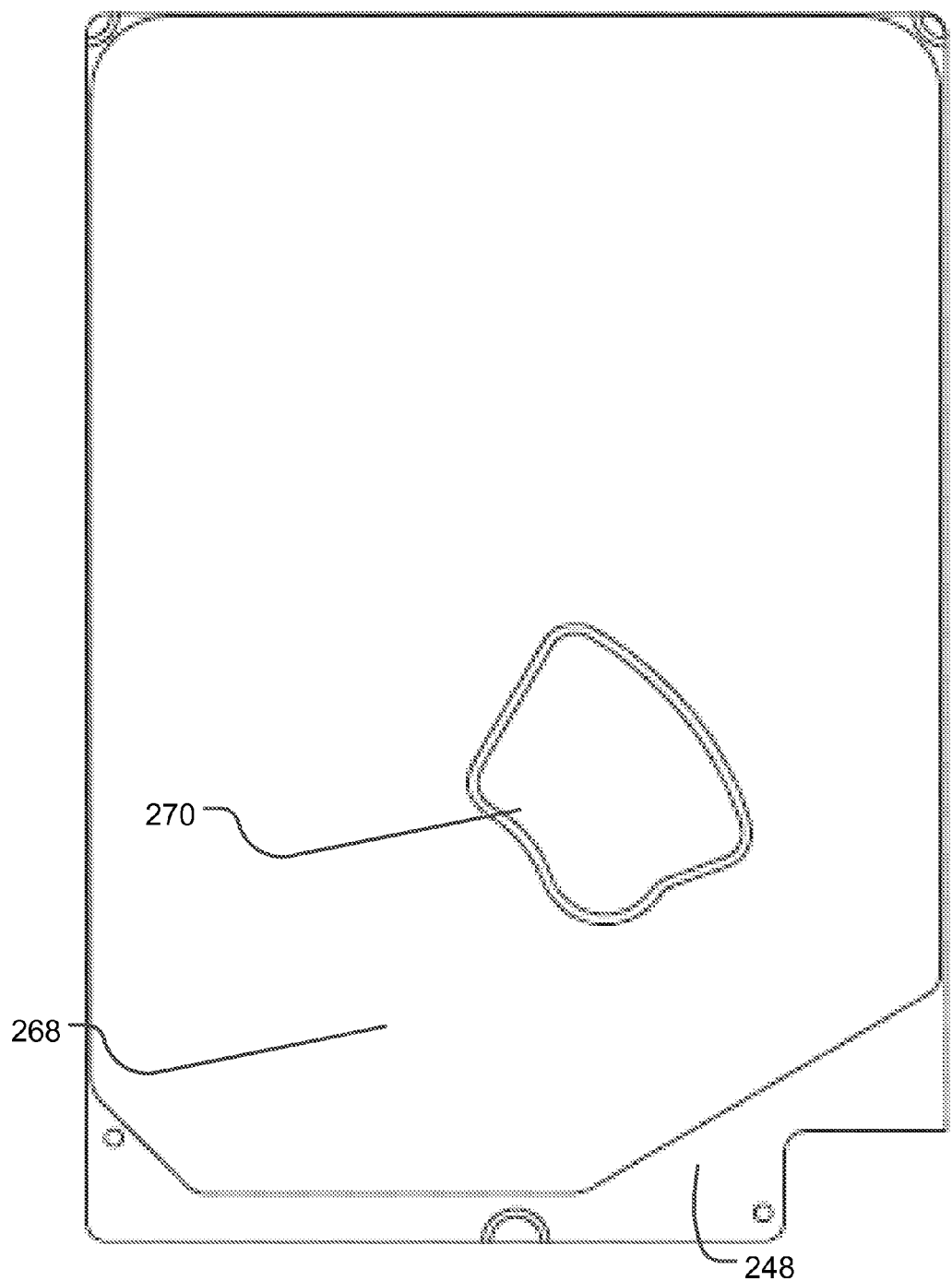
FIG. 5 is a top view illustrating the cover and enclosure according to the implementation of FIG. 2 with an additional sealing member attached.

FIG. 5 provides a top view illustrating the cover and enclosure according to the implementation of FIGS. 2 and 3 with an additional sealing member attached. In some implementations, a sealing member 268 may also be provided to create a hermetic seal within the drive. This sealing member 268 is not particularly limited, and may include a thin-film having adhesive applied to one side such that the sealing member to 268 conforms to features of the cover 222, the VCM assembly 242, and the enclosure 248. Further, the sealing member 268 may have a pre-cut widow 270 placed to allow clearance such that features of the cover 222 may protrude upward through the sealing member 268 while maintaining a hermetic seal. However, the sealing member 268 is not limited to this configuration and may include a thick sealing member have a rigid structure that is attached via screws or any other attachment mechanism as would be apparent to a person of ordinary skill in the art.

The foregoing detailed description has set forth various implementations of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, the implementations disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive enclosure comprising
   an enclosure main body forming an interior region, the interior region having a Voice Coil Motor (VCM) assembly receiving portion configured to hold a VCM assembly;
   at least one cover member configured to engage the enclosure main body and cover the interior region of the enclosure main body, and expose at least a portion of the VCM assembly receiving portion;
   wherein the cover member is configured to engage and be supported by an upper yoke of the VCM assembly disposed in the VCM assembly receiving portion of the enclosure main body; and
   a conformal sealing member configured to cover substantially all of: the VCM assembly, including the upper yoke, the cover member and the enclosure main body to substantially seal the disk drive enclosure, wherein the VCM assembly receiving portion of the enclosure main body comprises a side wall configured to extend upward to have a height substantially equal to the height of the VCM assembly on at least one side of the VCM assembly.

2. The drive enclosure of claim 1, wherein the cover member is configured to be supported by the VCM assembly at a location nearest a pivot point of an actuator arm disposed within the interior region of the disk drive enclosure.

3. The drive enclosure of claim 1, wherein the cover member is configured to be supported by a tab extending from a top plate of the VCM assembly, the tab at least partially covering a portion of a head stack assembly disposed adjacent to the VCM assembly.

4. The drive enclosure of claim 3, wherein the cover member comprises a tab extending toward the VCM assembly configured to engage the tab extending from the VCM assembly.

5. The drive enclosure of claim 4, wherein the cover member is configured to be received in a recess formed in the tab extending from the top plate of the VCM assembly.

6. The drive enclosure of claim 1, wherein the side wall of the VCM assembly receiving portion is configured to extend upward to have a height substantially equal to the height of the VCM assembly on at least two sides of the VCM assembly.

7. The drive enclosure of claim 1, wherein the sealing member is a thin-film member and is adhesively attached to the drive enclosure.

8. The drive enclosure of claim 1, wherein the VCM assembly comprises a top plate having a tab that extends from the VCM assembly to at least partially cover a latch mechanism for an actuator arm disposed within the interior region of the disk drive enclosure.

9. A disk drive assembly comprising:
   a disk drive enclosure comprising
      an enclosure main body forming an interior region, the interior region having a Voice Coil Motor (VCM) assembly receiving portion configured to hold a VCM assembly; and
      a cover member configured to engage the enclosure main body and cover the interior region of the enclosure main body, and expose at least a portion of the VCM Assembly receiving portion;
   a VCM assembly disposed within the VCM assembly receiving portion of the enclosure main body, the VCM assembly comprising an upper yoke formed by an upper plate, the upper yoke forming at least one cover supporting member configured to engage and support the cover member; and
   a conformal sealing member configured to cover substantially all of: the VCM assembly, including the upper yoke, the cover member and the enclose enclosure main body to substantially seal the disk drive assembly,
   wherein the VCM assembly receiving portion of the enclosure main body comprises a side wall configured to extend upward to have a height substantially equal to the height of the VCM assembly on at least one side of the VCM assembly.

10. The drive assembly of claim 9, wherein the cover supporting member is disposed on a side of the VCM assembly nearest a pivot point of an actuator arm disposed within the interior region of the disk drive enclosure.

11. The drive assembly of claim 9, wherein the cover supporting member of the VCM assembly comprises a tab extending from a top plate of the VCM assembly to at least partially cover a portion of a head stack assembly disposed adjacent the VCM assembly.

12. The drive assembly of claim 11, wherein the cover member comprises a tab extending toward the VCM assembly configured to engage the tab of the cover supporting member of the VCM assembly.

13. The drive assembly of claim 12, wherein the cover supporting member comprises a recess formed in the tab extending from the top plate of the VCM assembly, the recess configured to receive the tab of the cover member.

14. The drive assembly of claim 9, wherein the side wall of the VCM assembly receiving portion is configured to extend upward to have a height substantially equal to the height of the VCM assembly on at least two sides of the VCM assembly.

15. The drive assembly of claim 9, wherein the sealing member is a thin-film member and is adhesively attached to the drive assembly.

16. The drive assembly of claim 9, wherein the VCM assembly comprises a top plate having a tab that extends from the VCM assembly to at least partially cover a latch mechanism for an actuator arm disposed within the interior region of the disk drive enclosure.

\* \* \* \* \*